(12) United States Patent
Ng et al.

(10) Patent No.: US 9,156,999 B2
(45) Date of Patent: Oct. 13, 2015

(54) LIQUID INKJETTABLE MATERIALS FOR THREE-DIMENSIONAL PRINTING

(75) Inventors: Hou T. Ng, Campbell, CA (US); Doris Chun, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 762 days.

(21) Appl. No.: 13/193,329

(22) Filed: Jul. 28, 2011

(65) Prior Publication Data
US 2013/0026683 A1   Jan. 31, 2013

(51) Int. Cl.
| | |
|---|---|
| *B29C 35/08* | (2006.01) |
| *C08L 63/00* | (2006.01) |
| *C09D 11/101* | (2014.01) |
| *B29C 67/00* | (2006.01) |
| *C09D 11/322* | (2014.01) |

(52) U.S. Cl.
CPC .......... *C09D 11/101* (2013.01); *B29C 67/0059* (2013.01); *C09D 11/322* (2013.01); *B29C 2035/0827* (2013.01)

(58) Field of Classification Search
CPC ..................................................... C08L 63/00
USPC .......................................... 523/400; 264/494
See application file for complete search history.

(56) References Cited

U.S. PATENT DOCUMENTS

| | | | |
|---|---|---|---|
| 6,849,308 B1 * | 2/2005 | Speakman et al. ............ 427/595 |
| 7,578,958 B2 | 8/2009 | Patel et al. | |
| 7,744,205 B2 * | 6/2010 | Sarkisian et al. ............ 347/100 |
| 7,767,132 B2 | 8/2010 | Patel et al. | |
| 7,789,955 B1 * | 9/2010 | Gamblin et al. ............. 106/31.6 |
| 8,113,643 B2 * | 2/2012 | Sarkisian et al. | |
| 8,114,923 B2 * | 2/2012 | Sarkisian et al. ............. 523/160 |
| 2002/0149659 A1 * | 10/2002 | Wu et al. ........................ 347/102 |
| 2004/0207123 A1 | 10/2004 | Patel et al. | |
| 2005/0003189 A1 * | 1/2005 | Bredt et al. .................... 428/402 |
| 2005/0074511 A1 | 4/2005 | Oriakhi et al. | |
| 2005/0227590 A1 * | 10/2005 | Sung ............................... 451/41 |
| 2006/0106133 A1 * | 5/2006 | Tsubaki et al. ................ 523/160 |
| 2006/0185257 A1 * | 8/2006 | Nevoret et al. .................. 51/307 |
| 2006/0188813 A1 * | 8/2006 | Shimada et al. ........... 430/270.1 |
| 2006/0203057 A1 * | 9/2006 | Lauw et al. .................... 347/100 |
| 2006/0269723 A1 | 11/2006 | Kager et al. | |
| 2007/0003753 A1 * | 1/2007 | Asgari ....................... 428/315.5 |
| 2007/0007698 A1 * | 1/2007 | Sano ............................. 264/496 |
| 2007/0076068 A1 * | 4/2007 | Guo et al. ...................... 347/100 |
| 2007/0076075 A1 * | 4/2007 | Schmid et al. ................ 347/102 |
| 2007/0216742 A1 * | 9/2007 | Sarkisian et al. ............. 347/100 |
| 2007/0219290 A1 * | 9/2007 | Sarkisian et al. ............. 523/160 |
| 2007/0225401 A1 * | 9/2007 | Sarkisian et al. ............. 523/160 |
| 2008/0105818 A1 * | 5/2008 | Cohen ........................... 249/117 |
| 2008/0138515 A1 * | 6/2008 | Williams ...................... 427/222 |
| 2008/0157436 A1 * | 7/2008 | Patel et al. .................... 264/401 |

(Continued)

*Primary Examiner* — Megan McCulley
(74) *Attorney, Agent, or Firm* — Thorpe, North & Western L.L.P.

(57) ABSTRACT

The present disclosure is drawn toward compositions, systems, and methods for printing of three-dimensional objects. In one embodiment, a liquid inkjettable material for 3-dimensional printing can comprise from 0.1 wt % to 10 wt % of a pigment, from 10 wt % to 90 wt % of a UV-curable polymer, and from 0.1 wt % to 70 wt % of a polymeric filler. Additionally, the liquid inkjettable material can be jettable from piezo electric inkjet printer nozzles and has acceptable decap performance measured by jetting a normal 50 picoliter ink drop within 10 electric firing pulses after the piezo electric inkjet printer nozzles have been fired and have been subsequently rested for 24 hours.

18 Claims, 2 Drawing Sheets

(56) References Cited

U.S. PATENT DOCUMENTS

| | | |
|---|---|---|
| 2009/0105363 A1* | 4/2009 | Napadensky .................. 522/153 |
| 2009/0148813 A1* | 6/2009 | Sun et al. .................... 433/201.1 |
| 2009/0202722 A1* | 8/2009 | Yanagi et al. ................. 427/256 |
| 2010/0007692 A1* | 1/2010 | Vanmaele et al. .............. 347/21 |
| 2010/0140850 A1 | 6/2010 | Napadensky et al. |
| 2010/0144943 A1* | 6/2010 | Sakai et al. ................... 524/320 |
| 2010/0222492 A1* | 9/2010 | Sarkisian et al. ............. 524/507 |
| 2010/0291314 A1* | 11/2010 | Kashani-Shirazi ........... 427/521 |
| 2011/0043563 A1* | 2/2011 | Houjou ........................... 347/16 |
| 2012/0083566 A1* | 4/2012 | Deiner et al. ................. 524/507 |
| 2013/0085217 A1* | 4/2013 | Iu et al. ........................ 524/388 |

* cited by examiner

LIQUID INKJETTABLE MATERIALS FOR THREE-DIMENSIONAL PRINTING

BACKGROUND

Printing technologies can be used to create three-dimensional objects from data output of a computerized modeling source. For example, one can design a three-dimensional object using a computer program, and the computer can output the data of the design to a printing system capable of forming solid three-dimensional objects. More specifically, solid free-form fabrication (or layer manufacturing) can be defined generally as a fabrication technology used to build a three-dimensional object using layer by layer or point by point fabrication. With this fabrication process, complex shapes can be formed without the use of a pre-shaped die or mold.

Essentially, with such a system, an object can be designed using a computer program, such as a Computer Aided Design (CAD) application. Once the object has been designed three-dimensionally, solid free-form fabrication technology enables the translation of the computer generated model into a three-dimensional object. This technology is useful in areas such as verifying a CAD model, evaluating design feasibility, testing part functionality, assessing aesthetics, checking ergonomics of design, aiding in tool and fixture design, creating conceptual models and sales/marketing tools, generating patterns for investment casting, reducing or eliminating engineering changes in production, prototyping, and providing production runs, to name a few.

However, such systems can have limited material choices as well as provide slower than desired manufacturing. As such, ongoing research and developmental efforts continue in the field of three-dimensional object printing.

DETAILED DESCRIPTION

Figure 1:
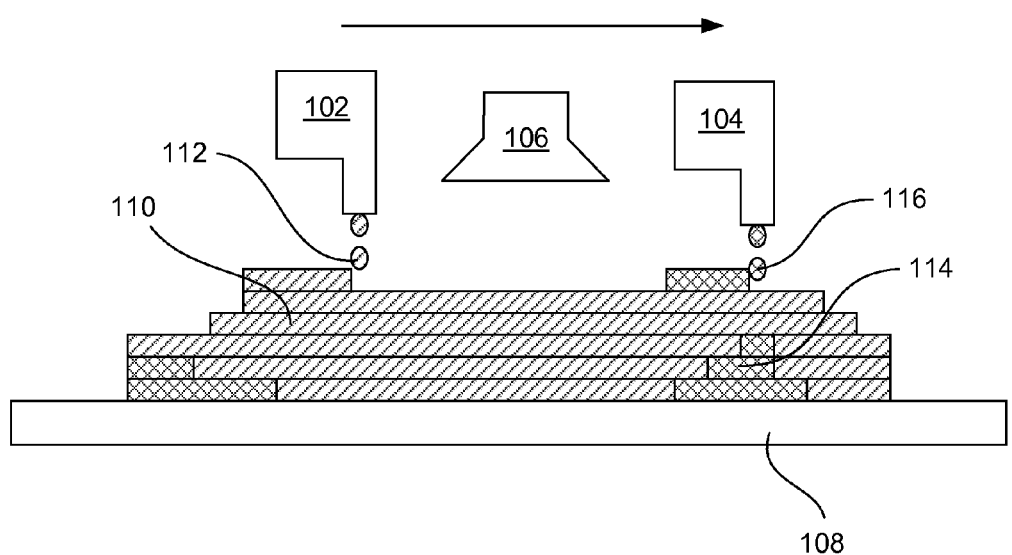
FIG. 1 is a schematic representation of systems in accordance with examples of the present disclosure.

Before the present disclosure is set forth, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a," "an," and "the" include plural referents unless the context clearly dictates otherwise.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one specific embodiment, however, the pigment is a pigment colorant.

As used herein, "decap" refers to the process of jetting a normal ink drop from pen nozzle by breaking the "plug" or "cap" of solidified ink. The plug or cap is currently understood to be generated by the evaporation of one or more liquid vehicle component.

As used herein, "decap performance" refers to the number of electric pulses fired before a normal ink drop is once again jetted out of an orifice after the nozzle has been rested for a certain amount of time. Resting of nozzles after firing can cause a plug to form, which hampers inkjetting performance. In one embodiment, an "acceptable decap performance" can be defined as an inkjet pen nozzle firing a normal ink drop within 10 electric firing pulses after the nozzle is rested for 24 hours. With respect to determining decap performance, a "normal" ink drop refers to ink fired from an inkjet pen without misdirection.

As used herein, "inkjetting" or "jetting" refers to compositions that are ejected from jetting architecture, such as inkjet architecture. The use of the term "inkjetting" does not infer that it is necessarily a traditional "ink" that is being jetted from the architecture, but rather includes the inkjetting of the compositions and materials described herein. Inkjet architecture can include thermal or piezo architecture. Additionally, such architecture can be configured to print varying drop sizes such as 5-10 picoliters, 10-20 picoliters, 20-30 picoliters, etc.

As used herein, "solid three-dimensional object" or "three-dimensional object" refers to objects that are formed by the fabrication methods of the present disclosure. Solid three-dimensional objects are sufficiently solid or firm so as to maintain a fixed volume and shape to an extent which is appropriate for use in solid free-form fabrication. In some embodiments, such objects need not be strictly rigid, such as in cases where the object formed is self-supporting at minimum, or alternatively, flexible.

As used herein, "hardening," "curing," "solidifying," or the like, refers to a change that occurs when the liquid inkjettable material and/or the support material are modified from a more liquid state to a more solid state. The process of solidifying can occur as a result of electromagnetic irradiation, e.g., UV curing, by overprinting or under printing a reactive chemical therewith, e.g., epoxy liquid inkjettable material jetted with an amine, for example, or combinations thereof.

As used herein, "liquid inkjettable material" includes inkjettable substances that can be used to form the bulk of the solid three-dimensional object to be formed. These materials typically include groups that can be solidified as a result of exposure to electromagnetic irradiation, such as UV radiation, as a result of a chemical reaction with a curing agent, or as a result of reducing the temperature of the material. Liquid inkjettable materials can include a liquid modifier admixed therewith when it is desired to alter the jettability properties, such as with respect to viscosity, surface tension, and the like. Temperature adjustment can also be used to alter the jettability properties as well. Examples of liquid inkjettable materials that can be used include UV photopolymers, epoxies, acrylates, urethanes, and polymeric fillers. Many UV curable materials can also be used which are commonly known to those skilled in the art, and are used throughout the industry in a variety of systems, such as stereolithography systems, jetted photopolymer systems, and the like. The term "liquid" does not necessarily infer that every ingredient in the composition is in liquid form, as there are examples where the liquid inkjettable includes a fine dispersed material therein.

As used herein, "support material" includes substances that are deposited, such as by inkjet technology, for the purpose of supporting overhangs of liquid inkjettable material present in a solid three-dimensional object during the build process. This material is typically of a material that can be relatively easily removed after the build process is complete, and can be configured to be placed as determined by the object being built. For example, a voxel, or point in three-dimensional space, that defines the placement of the liquid inkjettable material, cannot be deposited in mid-air. Thus, support for such liquid inkjettable material is needed whenever liquid inkjettable material is being printed at a location that is not otherwise supported by a build platform or previously applied liquid inkjettable material. Removable materials that can be used include the use of wax, patterned hardening composition, water swellable gel, readily meltable material, readily soluble material, or another material that can carry the solid three-dimensional object being built, as well as be configured to be readily removed. Removal can be by heating, chemical reaction, power washing, or other similar methods.

As used herein, "curing agent" includes substances that can react with reactive groups of a liquid inkjettable material, thereby curing the liquid inkjettable material. Curing agents can also include liquid modifiers admixed therewith, though this is not required, as long as the curing agent has desirable inkjetting properties. Temperature adjustment can also be used to alter the jettability properties as well. With respect to both liquid inkjettable material and curing agent, it is recognized that in certain instances, it may be difficult to determine which composition of a two part reactive system is the liquid inkjettable material and which composition is the curing agent. As long as the two parts can come together and form a solid three-dimensional object in accordance with embodiments of the present disclosure, this distinction is less significant. However, for exemplary purposes, one can consider the liquid inkjettable material to be present at higher content in the reactive mix, and very often, has a higher molecular weight than the curing agent. A curing agent is one type of curing system that can be used in accordance with embodiments of the present disclosure.

As used herein, "build platform" is typically the rigid substrate that is used to support a solid three-dimensional object as it is being formed.

As used herein, "substrate" can include the build platform, previously deposited support material, and/or previously deposited liquid inkjettable material, depending on the context. For example, in one embodiment, support material can be applied to a build platform to enable easy removal of the solid three-dimensional object from the build platform. In this case, the build platform is the substrate for the support material. Alternatively, previously deposited liquid inkjettable material and/or support material can be a substrate for subsequently applied liquid inkjettable material and/or support material. To illustrate, when laying down an initial layer of a liquid inkjettable material and/or support material, the initial layer will typically be carried by a build platform or a removable material on the build platform. However, subsequent layers of liquid inkjettable material and/or support material can be deposited onto the previously deposited layer substrate.

As used herein, "liquid modifier" refers to any composition that can be prepared for jetting with a liquid inkjettable material or a support material, and which, in combination, can be jetted from a dispensing architecture, such as inkjet pen architecture. Optionally, the liquid modifier can be a colorant to be jetted with the liquid inkjettable material. A wide variety of other liquid modifiers can be used with the systems and methods of the present disclosure. For example, such liquid modifiers that can be used include water, surfactants, organic solvents and co-solvents, buffers, biocides, sequestering agents, viscosity modifiers, as well as soluble low molecular weight monomers, oligomers, and polymers, etc.

Though liquid modifiers are described herein in some detail, it is not always the case that a liquid modifier is used. In some examples, the liquid inkjettable material or the support material can be configured to be jetted from an inkjet architecture without the use of a liquid modifier. For example, a wax can be heated to a jettable temperature and cooled upon application to form a support material. However, if such liquid modifiers are used, they are typically present in small amounts. An example where a liquid modifier can be added is with respect to examples wherein it is desired to alter the viscosity, surface tension, or the like, of the liquid inkjettable material and/or the support material. This being stated, modification of jettable compositions with a liquid modifier is not required, and in some cases, can be undesirable.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

The present disclosure is drawn to compositions, methods, and system related to three-dimensional (3-dimensional) printing. That being understood, it is noted that when discussing the present liquid inkjettable materials, associated methods, and systems, each of these discussions can be considered applicable to each of these examples, whether or not they are explicitly discussed in the context of that example. For example, in discussing a polymeric filler for use in a liquid inkjettable material, such a polymeric filler can also be used for a method for producing a three-dimensional object or a system for producing a three-dimensional object, and vice versa.

With this in mind, a liquid inkjettable material for 3-dimensional printing can comprise from 0.1 wt % to 10 wt % of a pigment, from 10 wt % to 90 wt % of a UV-curable polymer, and from 0.1 wt % to 70 wt % of a polymeric filler. In one example, the liquid inkjettable material can be jettable from piezo electric inkjet printer nozzles and have acceptable decap performance measured by jetting a normal 50 picoliter ink drop within 10 electric firing pulses after the piezo electric inkjet printer nozzles have been fired and have been subsequently rested for 24 hours. In one example, an acceptable decap performance can be measured by jetting a normal 10 picoliter ink drop within 10 electric firing pulses after the piezo electric inkjet printer nozzles have been fired and have been subsequently rested for 24 hours.

Typically, in accordance with FIG. 1 as an example, a solid free-form fabrication system includes a dispensing system 102 and 104 such as an inkjet dispensing system, a curing or hardening system 106, and a build platform 108. The inkjet dispensing system includes both liquid inkjettable materials 110 and 112 for forming three-dimensional objects, as well as support material 114 and 116 for supporting the liquid inkjettable material as it hardens. It has been recognized that modeling using inkjet solid free-form fabrication systems still have room for improvement as it relates to accuracy as well as efficiency of objects built using inkjet solid free-form fabrication systems. The present materials, methods, and system can provide excellent resolution over a range of viscosities, firing frequencies, and printing temperatures.

Figure 2:
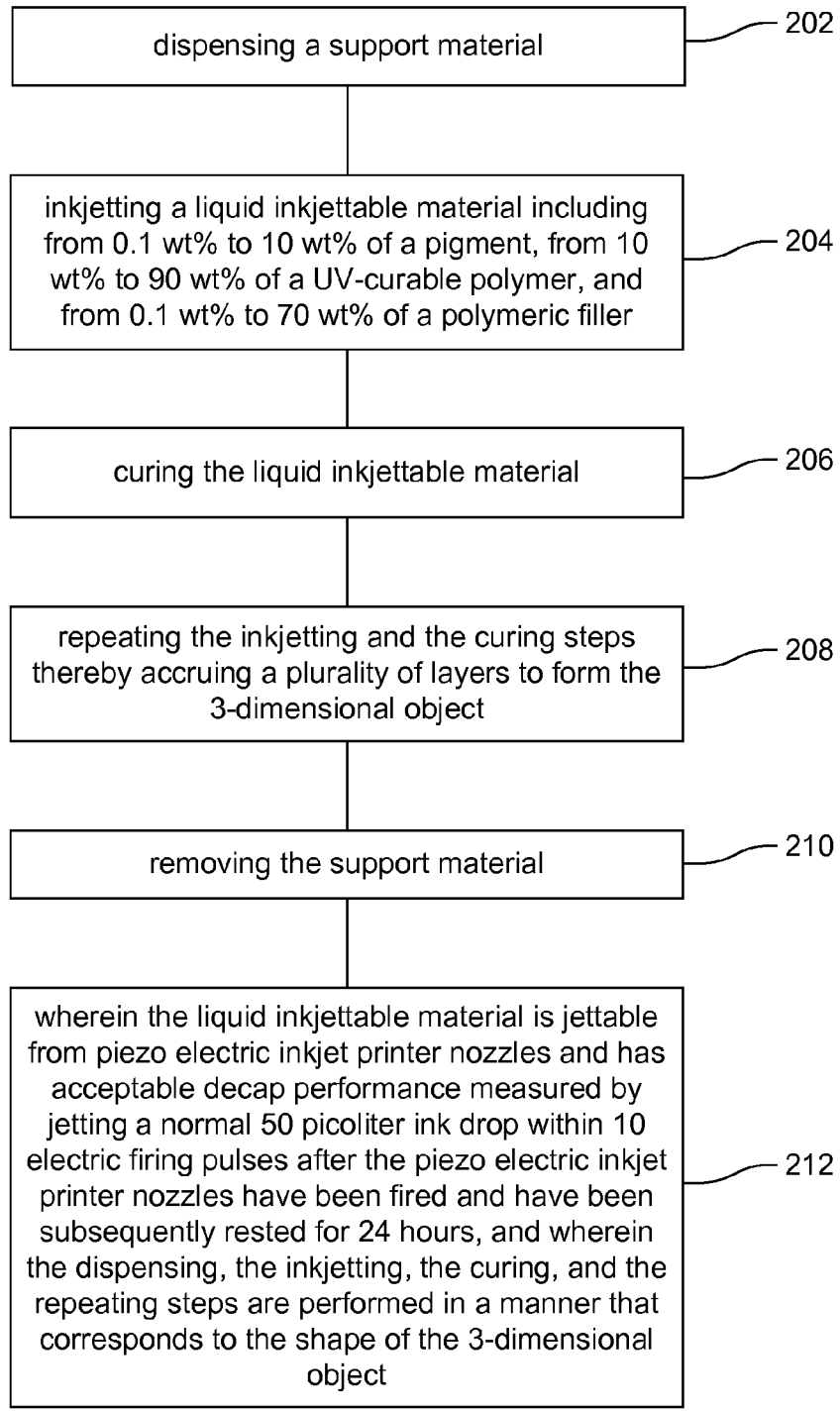
FIG. 2 is a flow chart representative of methods in accordance with examples of the present disclosure.

Additionally, as set forth in FIG. 2, a method of producing a 3-dimensional object can comprise dispensing a support material 202, inkjetting a liquid inkjettable material 204, curing the liquid inkjettable material 206, repeating the inkjetting and the curing thereby accruing a plurality of layers to form the 3-dimensional object 208, and removing the support material 210. The liquid inkjettable material can be a material that is described in further detail below, but in can have various properties 212. Specifically, the liquid inkjettable material can be jettable from piezo electric inkjet printer nozzles and have acceptable decap performance measured by jetting a normal 50 picoliter ink drop within 10 electric firing pulses after the piezo electric inkjet printer nozzles have been fired and have been subsequently rested for 24 hours, and wherein the dispensing, the inkjetting, the curing, and the repeating steps are performed in a manner that corresponds to the shape of the 3-dimensional object.

Generally, in these examples, the pigment can be any pigment type, but typically, a pigment colorant is selected for use to provide a desired color scheme. Suitable pigments include black, magenta, cyan, yellow, blue, orange, red, green, violet, etc., but other colors can also be used. Additionally, such pigments can have a pigment size ranging from about 20 nm to about 1000 nm. In one example, the pigment can be present in the inkjettable material at from about 1 wt % to about 6 wt %.

The inkjettable materials generally include a UV-curable polymer. In one example, the UV-curable polymer can be an epoxy. In one aspect, the UV-curable polymer can be a medical grade epoxy, such as UVI OMED or UV18 MED by Masterbond. In another example, the UV-curable polymer can be present at from 25 wt % to 75 wt %. Other examples of other UV curable polymers include acrylates, methacrylates, epoxy acrylates, urethane acrylates, polyester acrylates, vinyl ethers, styrene, and cationic cure epoxies. With these materials, UV energy from 250 nm to 450 nm in wavelength and power levels from 20 to 300 mW/cm$^2$ can be used in connection with UV curing systems as discussed herein.

Additionally, the present inkjettable materials generally include a polymeric filler. The polymeric filler can include, without limitation, at least one polymer selected from the group of poly(acrylonitrile, butadiene, styrene) (ABS) polymer; poly(methyl methacrylate) (PMMA) polymer; polycarbonate (PC); polypropylene (PP); polyethylene methacrylate copolymers; polyethylene acrylate copolymers and mixtures thereof. In one example, the polymeric filler can be ABS. Additionally, the polymeric filler can be present at from 30 wt % to 60 wt %.

In addition to providing acceptable decap performance, the present inkjettable materials can provide other desirable characteristics. In one example, the liquid inkjettable material can have a hardness of at least 80 shore D after curing. Additionally, the liquid inkjettable material can be printable at resolution of 25 µm and above. Further, the liquid inkjettable material can have a viscosity from about 5 cps to about 50 cps. In one example, the liquid inkjettable material can be jettable within the entire range of 1 kHz to 50 kHz. In another example, the liquid inkjettable material can be printed over a temperature range of about 30° C. to about 80° C.

Regarding the present systems, as discussed herein, in addition to the present liquid inkjettable materials, such systems generally include an inkjettable printing system, a support system, a dispensing system, and a UV curing system.

Additionally, such system can further comprise a build platform configured to support the liquid inkjettable material. In one example, the build platform can also be configured to be lowered with respect to the inkjettable printing system upon application of liquid inkjettable material. In another example, the inkjettable printing system can be configured to be raised with respect to the build platform upon application of liquid inkjettable material. Further, such systems can further comprise a build platform configured to be titled at a defined angle with respect to the nozzle horizontal plane of the printing system.

The dispensing systems described herein can also include support material, such as to support liquid inkjettable material overhangs. Additionally, milling systems can be present that are adapted to mill, or plane, the liquid inkjettable material after being dispensed but before being hardened. Such milling systems can include, for example, rollers that apply pressure to newly jetted liquid inkjettable material and/or support material.

More specifically, with respect to the build platform or substrate, such a platform can include removable material such as wax, patterned hardening composition, water swellable gel, readily meltable material, readily soluble material, or another material that can partially carry the solid three-dimensional object being built, as well as be configured to be readily removed. For example, in one example, the build platform substrate can initially be of a removable material upon which the liquid inkjettable material and/or the support material are deposited.

In another example, in order to configure the liquid inkjettable material and/or support material to be dispensable from inkjet architecture, a heating system can be present that is associated with the architecture that is configured to modify the temperature of the liquid inkjettable material while within the dispensing system, thereby improving jettability of such materials. Regarding the curing system, either UV curing, e.g., use of UV energy;

chemical curing, e.g., use of curing agent; or curing accelerant can be used in accordance with examples of the present disclosure. For example, with UV curing, UV energy can be applied to liquid inkjettable material that has been deposited on a substrate, thereby hardening or solidifying the liquid inkjettable composition.

Additionally, if chemical curing, a volume ratio of liquid inkjettable material to curing agent or curing accelerant can be from 1:1 to 100:1. As discussed herein, liquid inkjettable materials that can be used in chemical curing systems can include an epoxy. Epoxies can be cured using one of many known substances that react with the epoxy group to open its epoxide ring structure(s). Examples of functional groups that can be capable of reacting with an epoxide ring in this manner are amino groups, hydroxyl groups, and carboxyl groups.

Other examples of a chemical curing system include polyisocyanate liquid inkjettable materials and polyol curing agent, and functionalized silicone liquid inkjettable materials and curing agents reactive with the functionality, to name a few. It is also notable that UV curing can also be used in conjunction with chemical curing. In another example, one can apply heat to the liquid inkjettable material after deposition in order to accelerate curing. Ultrasonic energy can also optionally be applied to the liquid inkjettable material after deposition to facilitate mixing when the liquid inkjettable material is cured using a second composition, such as a curing agent, as ultrasonic energy can improve contact between the liquid inkjettable material and the curing agent.

The viscosity of a liquid inkjettable material can generally be lowered by increasing its temperature. As the liquid inkjettable material (or other jettable material, such as curing agent or support material, etc.) is used to form solid objects, the use of higher temperatures can allow more viscous higher molecular weight materials to be used, which can provide for increased toughness of the three-dimensional object upon cooling. In addition to the heating option, the viscosity of a fluid can also be lowered by adding low molecular weight monomers and oligomers, and/or by adding small amounts of liquid modifiers. Regarding inkjettablility, the present compositions can be inkjetted using thermal piezoelectric printing technologies.

Examples of liquid modifier components that can be used in the liquid inkjettable materials, in small amounts if at all, include water, surfactants, organic solvents and co-solvents, buffers, biocides, sequestering agents, viscosity modifiers, as well as soluble low molecular weight monomers, oligomers, and polymers, etc. As mentioned, liquid modifiers are typically not added to carry the liquid inkjettable material and/or the support material, but can optionally be added to modify jetting characteristics, such as viscosity, surface tension, or other properties.

EXAMPLES

The following examples illustrate the embodiments of the disclosure that are presently best known. However, it is to be understood that the following examples are only illustrative of the application of the principles of the present disclosure. Numerous modifications and alternative compositions, methods, and systems may be devised by those skilled in the art without departing from the spirit and scope of the present disclosure. The appended claims are intended to cover such modifications and arrangements. Thus, while the present disclosure has been described above with particularity, the following Examples provide further detail in connection with what are presently deemed to be the most practical examples of the disclosure.

Example 1

Preparation of a Liquid Inkjettable Material with Magenta Pigment

Approximately 0.3 g of magenta pigment was mixed with approximately 0.6 g of latex polymeric beads (RAYKOTE® from Specialty Polymers Inc.; styrene acrylic emulsion polymer) in 9.46 g of a UV-curable medical grade epoxy glue (UV11-3 from Masterbond Inc., 22 cps at 80° C.). A homogenous dispersion was obtained by ultrasonication for 5 minutes with cooling of the mixture in a temperature controlled bath.

Example 2

Preparation of a Liquid Inkjettable Material with Magenta Pigment

Approximately 0.3 g of magenta pigment was mixed with approximately 0.6 g of latex polymeric beads (RAYKOTE® from Specialty Polymers Inc.; styrene acrylic emulsion polymer) in 9.46 g of a UV-curable medical grade epoxy glue (UV15 from Masterbond Inc.; 22 cps at 80° C.) and approximately 2 g of curable 1-vinyl-2-pyrollidone. A homogenous dispersion was obtained by ultrasonication for 5 minutes with cooling of the mixture in a temperature controlled bath.

Example 3

Preparation of a Liquid Inkjettable Material with Green Pigment 0.14 g of green pigment was mixed with approximately 0.6 g of latex polymeric beads (RAYKOTE® from Specialty Polymers Inc.; styrene acrylic emulsion polymer) in 9.46 g of a UV-curable medical grade epoxy glue (UV11-3 from Masterbond Inc.; 22 cps at 80° C.). A homogenous dispersion was obtained by ultrasonication for 5 minutes with cooling of the mixture in a temperature controlled bath.

Example 4

Preparation of a Liquid Inkjettable Material with Green Pigment 0.14 g of a green pigment was mixed with 0.6 g of latex polymeric beads (RAYKOTE® from Specialty Polymers Inc.; styrene acrylic emulsion polymer) in 9.46 g of a UV-curable medical grade epoxy glue (UV15 from Masterbond Inc.; 22 cps at 80° C.) and approximately 2 g of curable 1-vinyl-2-pyrollidone. A homogenous dispersion was obtained by ultrasonication for 5 minutes with cooling of the mixture in a temperature controlled bath.

Example 5

Decap Performance

The inkjettable compositions of Examples 1-4 were printed using a piezo electric printhead at 5 kHz and 40 mV at 60° C. with the resulting decap performances as listed in Table 1. A "pass" was measured by jetting a normal 10 picoliter ink drop within 10 electric firing pulses after the piezo electric inkjet printer nozzles have been fired and have been subsequently rested for 24 hours.

TABLE 1

| Inkjettable Material | Decap Performance |
| --- | --- |
| Example 1 | Pass |
| Example 2 | Pass |
| Example 3 | Pass |
| Example 4 | Pass |

As can be seen in Table 1, the present formulations all had acceptable decap performance. Such results stand in contrast to traditional systems, e.g. dispersions of similar pigments (~5%) in oil-based solvent (such as isoparrafin (ISOPAR® L from ExxonMobile Chemicals)) with dispersant (~1%) will have decap issues.

Furthermore, it is notable that when the liquid inkjettable materials are jetted a temperature from 30° C. to 80° C. such that the viscosity remains within the range of 5 cps to 50 cps, these inkjettable materials can be jetted within the entire range of 1 kHz to 50 kHz.

While the present disclosure has been described with reference to certain examples, those skilled in the art will appreciate that various modifications, changes, omissions, and substitutions can be made without departing from the spirit of the disclosure. Thus, the disclosure is intended to cover various modifications and equivalent arrangements included within the spirit and scope of the claims.

What is claimed is:

1. A liquid inkjettable material for 3-dimensional printing, comprising:
   from 0.1 wt % to 10 wt % of a pigment;
   from 10 wt % to 90 wt % of a UV-curable polymer; and
   from 0.1 wt % to 70 wt % of a latex polymeric filler;
   wherein the liquid inkjettable material i) is formulated for 3-dimensional printing, ii) is jettable from piezo electric inkjet printer nozzles and iii) has acceptable decap performance measured by jetting a normal 50 picoliter ink drop within 10 electric firing pulses after the piezo electric inkjet printer nozzles have been fired and have been subsequently rested for 24 hours.

2. The liquid inkjettable material of claim 1, wherein the pigment is a pigment colorant having a pigment size ranging from about 20 nm to about 1000 nm.

3. The liquid inkjettable material of claim 1, wherein UV-curable polymer is an epoxy.

4. The liquid inkjettable material of claim 1, wherein the UV-curable polymer is present at from 25 wt % to 75 wt %.

5. The liquid inkjettable material of claim 1, wherein the latex polymeric filler include at least one polymer selected from the group consisting of: poly(acrylonitrile, butadiene, styrene) (ABS) polymer; poly(methyl methacrylate) (PMMA) polymer; polycarbonate (PC); polypropylene (PP); polyethylene methacrylate copolymers; polyethylene acrylate copolymers; and mixtures thereof.

6. The liquid inkjettable material of claim 1, wherein the latex polymeric filler is present at from 30 wt % to 60 wt %.

7. The liquid inkjettable material of claim 1, wherein the liquid inkjettable material has a hardness of at least 80 shore D after curing.

8. The liquid inkjettable material of claim 1, wherein the liquid inkjettable material is printable at resolution of 25 μm and above.

9. The liquid inkjettable material of claim 1, wherein the liquid inkjettable material has a viscosity from about 5 cps to about 50 cps and is jettable within the entire range of 1 kHz to 50 kHz and within the temperature range of 30° C. to 80° C.

10. The liquid inkjettable material of claim 1, wherein the UV-curable polymer consists of an epoxy and the liquid inkjettable material does not include a liquid modifier.

11. The liquid inkjettable material of claim 1, wherein the UV-curable polymer is an epoxy and the liquid inkjettable material consists of the pigment, the latex polymeric filler, and the epoxy.

12. A system for producing a 3-dimensional object, comprising:
    a liquid inkjettable material formulated for 3-dimensional inkjet printing, including:
        from 0.1 wt % to 10 wt % of a pigment,
        from 10 wt % to 90 wt % of a UV-curable polymer, and
        from 0.1 wt % to 70 wt % of a latex polymeric filler;
    an inkjettable printing system for inkjetting the liquid inkjettable material;
    a support material formulated to support overhanging printed liquid inkjettable material and to be removed after the liquid inkjettable material has hardened;
    a dispensing system for dispensing the support material adjacent the liquid inkjettable material; and
    a UV curing system for hardening the liquid inkjettable material after being inkjetted;
    wherein the liquid inkjettable material is jettable from piezo electric inkjet printer nozzles and has acceptable decap performance measured by jetting a normal 50 picoliter ink drop within 10 electric firing pulses after the piezo electric inkjet printer nozzles have been fired and have been subsequently rested for 24 hours.

13. The system of claim 12, further comprising a build platform configured to support the liquid inkjettable material, the build platform also being configured to be lowered with respect to the inkjettable printing system upon application of liquid inkjettable material.

14. The system of claim 12, further comprising a build platform configured to support the liquid inkjettable material, the inkjettable printing system being configured to be raised with respect to the build platform upon application of liquid inkjettable material.

15. The system of claim 12, further comprising a build platform configured to be titled at a defined angle with respect to the nozzle horizontal plane of the printing system.

16. A method of producing a 3-dimensional object, comprising:
    dispensing a support material;
    inkjetting a liquid inkjettable material including:
        from 0.1 wt % to 10 wt % of a pigment,
        from 10 wt % to 90 wt % of a UV-curable polymer, and
        from 0.1 wt % to 70 wt % of a latex polymeric filler;
    curing the liquid inkjettable material;
    repeating the inkjetting and the curing steps thereby accruing a plurality of layers to form the 3-dimensional object; and
    removing the support material,
    wherein the liquid inkjettable material is jettable from piezo electric inkjet printer nozzles and has acceptable decap performance measured by jetting a normal 50 picoliter ink drop within 10 electric firing pulses after the piezo electric inkjet printer nozzles have been fired and have been subsequently rested for 24 hours, and wherein the dispensing, the inkjetting, the curing, and the repeating steps are performed in a manner that corresponds to the shape of the 3-dimensional object.

17. A method as in claim 16, wherein UV-curable polymer is an epoxy.

18. A liquid inkjettable material for 3-dimensional printing, consisting of:
    from 0.1 wt % to 10 wt % of a pigment;
    from 10 wt % to 90 wt % of an epoxy UV-curable polymer; and
    from 0.1 wt % to 70 wt % of a polymeric filler;
    wherein the liquid inkjettable material i) is formulated for 3-dimensional printing, ii) is jettable from piezo electric inkjet printer nozzles and iii) has acceptable decap performance measured by jetting a normal 50 picoliter ink drop within 10 electric firing pulses after the piezo electric inkjet printer nozzles have been fired and have been subsequently rested for 24 hours.

* * * * *